United States Patent [19]
Eberle

[11] 3,841,915
[45] Oct. 15, 1974

[54] BATTERY, COMPONENTS, AND METHOD OF MAKING

[75] Inventor: William J. Eberle, Reading, Pa.

[73] Assignee: General Battery Corporation, Reading, Pa.

[22] Filed: Aug. 31, 1972

[21] Appl. No.: 285,460

[52] U.S. Cl. .............................. 136/134 R, 136/170
[51] Int. Cl. ............................................ H01m 1/02
[58] Field of Search................. 136/134 R, 170, 176

[56] References Cited
UNITED STATES PATENTS

| | | | |
|---|---|---|---|
| 1,907,420 | 5/1933 | Finn................................ | 136/134 R |
| 2,287,802 | 6/1942 | Hill..................................... | 136/176 |
| 2,618,673 | 11/1952 | Shannon et al.................. | 136/134 R |
| 2,637,759 | 5/1953 | Shannon.......................... | 136/134 R |
| 3,396,056 | 8/1968 | Gonnard.......................... | 136/134 R |

Primary Examiner—Donald L. Walton
Attorney, Agent, or Firm—Paul & Paul

[57] ABSTRACT

A battery is provided, generally of the lead acid storage type, having spaced plates therein, with selected plates connected together in electrically conductive fashion, and with plates on opposite sides of partitions between adjacent cells of the battery being connected, wherein particularly novel types and placements of such connections facilitate low resistance in connections between connected plates of adjacent cells, by preferably facilitating a short electrical path between plates, as well as for presenting other advantageous features.

13 Claims, 14 Drawing Figures

BATTERY, COMPONENTS, AND METHOD OF MAKING

BACKGROUND OF THE INVENTION

In prior art types of batteries, most particularly lead acid storage batteries adapted for use in automobiles and the like, batteries conventionally have multiple cells, such as four cells or six cells. These cells contain plates that are separated one from the other by separators, and with the plates being immersed in an electrolyte in the cells. Alternate plates in each cell are connected together by connections of upstanding lugs by straps (generally weldments). One strap is thus disposed along each one of opposite sides of each cell. In each cell, some plates are connected to plates of another cell, by joining the straps of adjacent cells by posts that extend upwardly over the partition that separates such adjacent cells, with the posts being welded across the top of the partition. The various cells are serially connected in this manner, to facilitate electron flow between adjacent cells, through the electrolyte, with plates at opposite ends of the batteries having straps connected to battery terminals.

Batteries constructed in accordance with such prior art techniques may have certain disadvantageous features. For example, with the use of posts connected across the top of partition plates that separate cells, such is desirable in that the welded connections of post halves together to comprise such posts are disposed out of the electrolyte (generally acid). However, such are still disposed in the head space zone above the electrolyte level, thereby still being subject to corrosion by acid vapors and the like. Also, the amount of material (generally lead) that is required to extend the post halves up over the partition plate is substantial and such may become a cost factor in battery manufacture. Also, the space occupied by such posts infringes upon space that may otherwise be utilized as head space in the battery, needed to accommodate electrolyte vapor. Furthermore, such long paths between the plates that are necessitated by the use of posts as above-described, introduces resistance of substantial portions, to current flow from one cell to another, such resistance being in some instances, measurable and significant. Thus, the functioning of the battery itself may be impaired by such long paths of electrical connection from plates in one cell, to plates in another cell.

An additional problem with respect to the operation of batteries thus constructed, with posts that are welded together above the partition plates is that detection of improper electrical connections is not readily possible, and shorts caused by improper weldments and the like in the hydrogen atmosphere of the head space above the electrolyte can cause explosions. Furthermore, with regard to manufacturing the batteries, after the cover is applied to a casing, it becomes impossible to visually check the welded connections between plates of one cell and plates of another cell, for electrical conductivity.

One attempt to accommodate the head space requirement, in prior art techniques of manufacturing batteries, in order to reduce the disadvantageous effect of utilizing posts between adjacent cells as described above, has been to starve the batteries for electrolyte, by providing less electrolyte than adequate for proper operation of the batteries, as a sacrifice in order to allow sufficient space above the liquid electrolyte for gasing and condensation, as well as for expansion of the liquid electrolyte. However, this does not solve all of the problems set forth above, and additionally, may affect the operation and/or life of the battery.

Another development in the art of battery manufacture has been to provide a connection between straps of adjacent cells that extend through the partition wall that separates such cells, rather than having the longer path up over the partition wall. This modification has facilitated the shortening of the electrically conductive path between adjacent cells, and has reduced the material expense involved in battery manufacture, in requiring less lead, but has introduced problems such as the difficulty of facilitating a visual inspection for electrical continuity of the connection between opposite sides of the partition even before the cover is placed on the battery casing, as well as placing a limitation upon the amount of electrolyte, or the height of electrolyte that may be provided into the cells below the connection. Furthermore, by introducing a perforation into the partition between adjacent cells, a problem of sealing the perforation about the welded connection that exists through the partition, is presented, if the transfer of electrolyte between adjacent cells is to be prevented.

Some of the above-discussed problems in the art of battery manufacture have been eliminated by other developments in the art, but specific forms of such developments have not been particularly addressed to the problem of constructing a battery, by welding or the like, from above the battery, particularly if such construction from above is to be done without turning a battery on its side, or otherwise re-orienting the battery.

THE PRESENT INVENTION

The present invention seeks to obviate the many problems discussed above, in providing a novel battery construction, and a novel method of battery construction, whereby it is not necessary to re-orient the battery from an upstanding position thereof during manufacture, and whereby the battery has connections between plates of the same cell and between plates of adjacent cells on opposite sides of partitions, that are outside the environment of the electrolyte, and that are outside the interior of the battery itself, by providing such connections in the battery cover, by extending the lugs of battery cell plates up through openings in the battery cover and welding or otherwise effecting electrically conductive connections between lugs thus extended, with the weldments then being protectively coated with an electrically non-conductive material. Thus, the connections across partitions would be made outside the acid vapor environment, and the connections would be short, to reduce electrical resistance between plates of adjacent cells, in that the cover may be made to have sufficient depth to extend downwardly into the casing. Also, because the connections would be disposed outside the hydrogen atmosphere within the battery after the electrolyte is added, the danger of explosion as discussed above would be reduced. Also, by shortening such electrical paths in such a manner, the connections can be made with less lead, thereby producing an economic benefit. Moreover, it is not necessary, by virtue of the present invention, to starve the battery for electrolyte, thereby yielding operational advantages by the present invention. Furthermore, because there will be no breach of the partition wall, any tendency toward transfer of electrolyte from one cell to another would be eliminated. Another feature of this invention resides in the use of a spacer member for facilitating the alignment and position maintenance of the plates, during assembly. Still another feature resides in the capability of constructing the battery of this invention without requiring the turning of the battery on its side, and in such a way that the welding may be done from above, thereby not introducing weld flow problems attendant to welding in various positions. Even further, the battery in accordance with the present invention lends itself to construction by concurrent machine welding operations, whereby various weldments may simultaneously be effected.

Also, in accordance with some prior art techniques, it was possible for assembly workers to drop plates into cells backwards, which would result in a reverse cell within the battery, such reverse cell having the capability for reducing the positive plates and converting portions of the negative plates to lead peroxide, upon application of the acid, such being the reverse of the intended function of such plate.

In accordance with that feature of the invention herein directed to the use of spacer members for aligning and maintaining the alignment of plates, prior to assembly of the cover onto the battery casing, after the plates have been disposed within the casing. Such slotted spacer members are preliminarily constructed to receive a given number of positive plates, and a like number plus one of negative plates, thereby making it impossible for one to inadvertently place a negative plate in a positive orientation, or the converse, without creating an apparent and observable misalignment of plate lugs with spacer slots. Accordingly, the present invention provides this advantage as well, of rendering unlikely the misalignment of plates during assembly.

SUMMARY OF THE INVENTION

The present invention is directed toward providing a multiple cell battery utilizing plates in each cell, with the connections of plates in a given cell, and with the connections of plates in adjacent cells taking place through the battery cover, outside the interior of the battery, at least with respect to those connections not associated with battery end terminals.

Accordingly, it is an object of this invention to provide a novel battery.

It is a further object of this invention to provide a novel method of making a battery.

It is another object to provide a novel battery utilizing connections between plates of adjacent cells, wherein such connections are disposed outside the interior of the battery, through or in the battery cover.

It is a further object of this invention to provide a novel battery cover.

It is a further object of this invention to provide novel battery features and methods of manufacture, that will facilitate ease of construction of the battery, with minimum of manipulations of the battery during manufacture, and that will lend itself to simultaneous welding operations.

Other objects and advantages of the present invention will become readily apparent to those skilled in the art from a reading of the following brief descriptions of the drawing figures, detailed descriptions of the preferred embodiments, and the appended claims.

Figure 1:
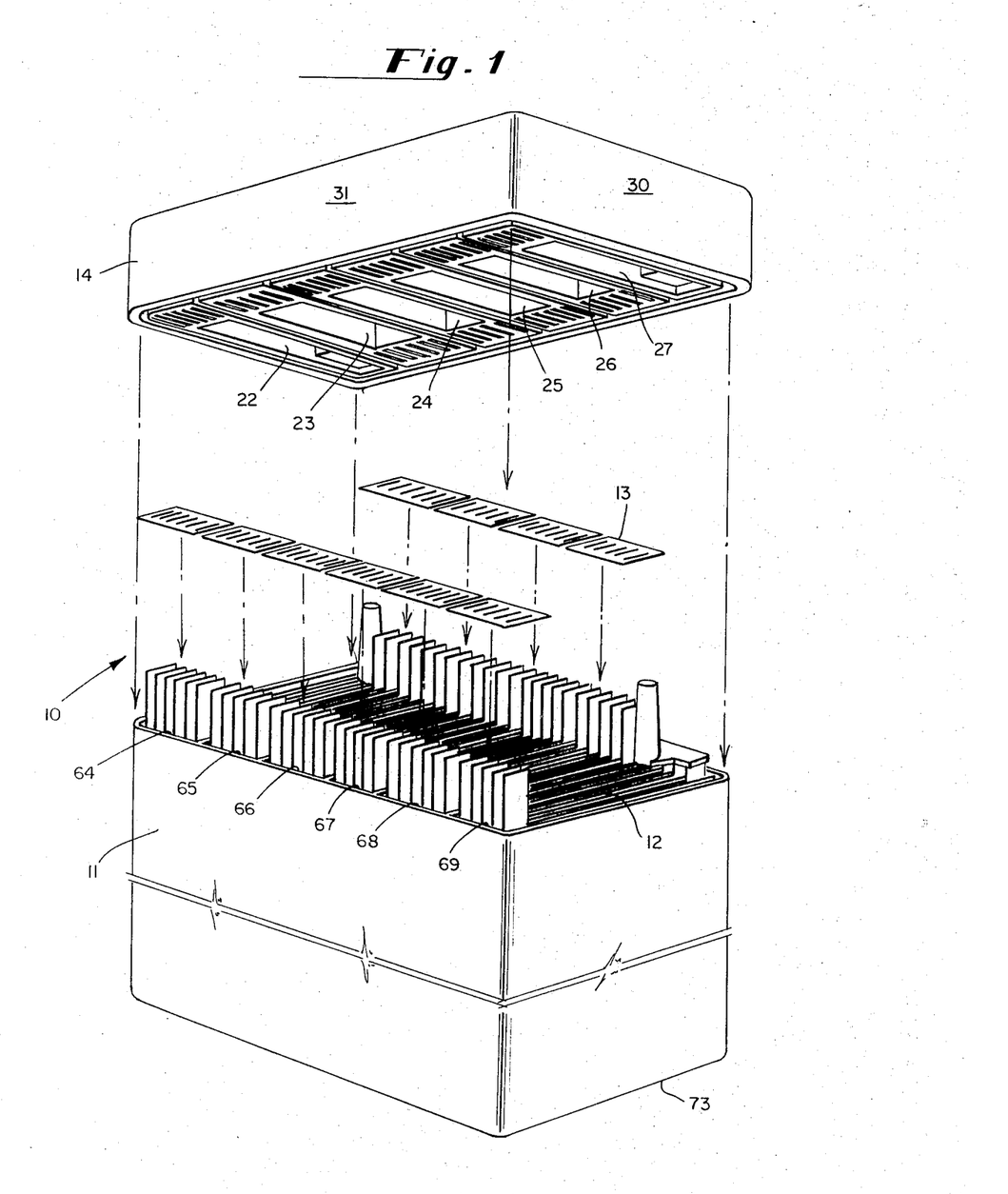
FIG. 1 is an exploded perspective view of the battery of this invention, wherein various components are illustrated in a manner readily depicting the assembly thereof.

Referring now to the drawings in detail, reference is first made to FIG. 1, wherein the battery of this invention is generally designated by the numeral 10, as comprising a casing 11, cell plates such as 12, plate-lug spacers such as 13, and a battery cover 14. It will be understood that weldments, separators between adjacent plates, terminal posts, straps for terminal posts, etc., are also included as components of the battery, and that a liquid acid type electrolyte will also be included within an operating battery. It will further be understood that the term "battery" as used herein will be construed to encompass the structure involved, prior to introducing an electrolyte into the casing.

Figure 2:
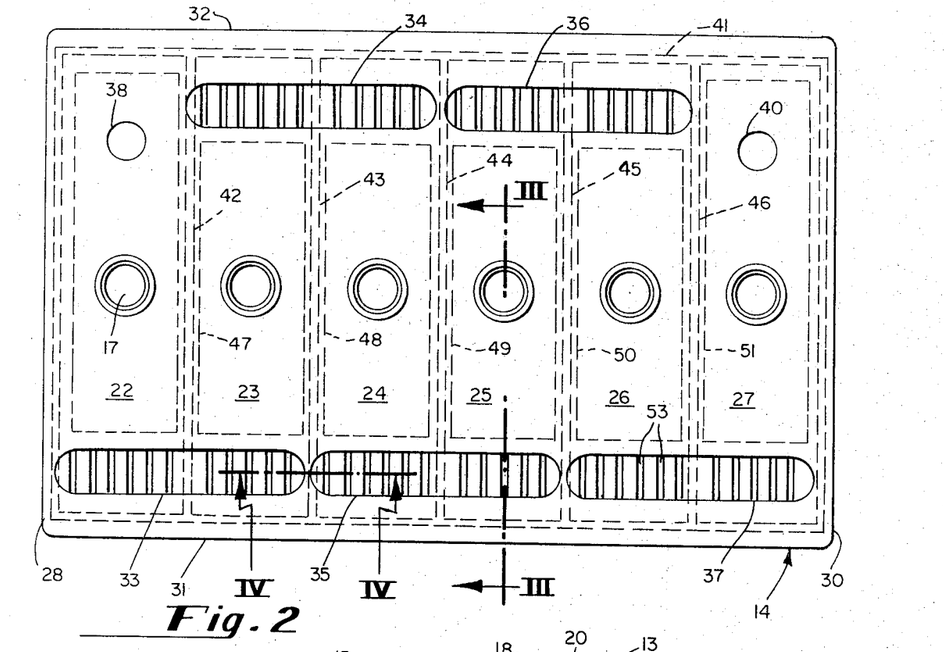
FIG. 2 is a top plan view of the battery cover of this invention, illustrated in perspective in FIG. 1.
Figure 3:
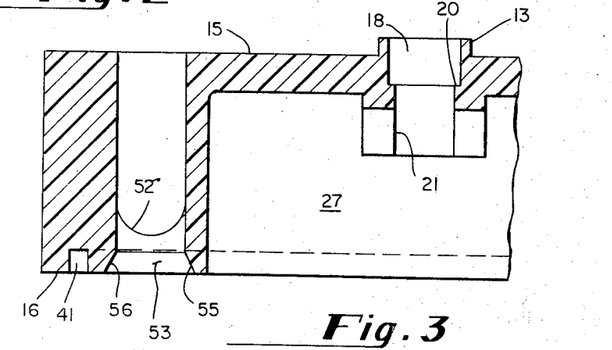
FIG. 3 is an enlarged fragmentary transverse sectional view, taken through the battery cover of FIG. 2, generally along the line III—III of FIG. 2.
Figure 4:
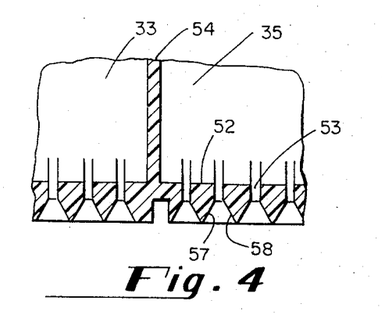
FIG. 4 is an enlarged fragmentary sectional view taken through the battery cover of FIG. 2, generally along the line IV—IV of FIG. 2.

With particular reference to FIGS. 2, 3 and 4, the cover 14 is indicated as being of one-piece molded construction, preferably of a hard rubber-like, or plastic material, and most preferably a thermoplastic having acid resistant and electrically non-conductive qualities.

The cover 14 includes an upper surface 15 and a lower surface 16. A plurality of openings 17 are provided (generally one for each cell of the battery) for facilitating the addition of acid or water thereinto, as well as for checking the liquid level within the battery from time to time. Such openings 17 may be of conventional construction, integrally molded with the cover 14, but preferably having an upstanding boss 17, disposed above the level of the upper surface 15, as an additional feature of this invention, for preventing in-flow of rain, water, or debris into the battery cells. The openings 17 may have an upper generally circular part 18, terminating in a shoulder 20, for receiving a plug, cell cap or the like thereinto, and an inner bore portion 21 of any selected design, but generally being cylindrical in construction.

The cover 14 has, carved into its lower surface 16, six head space openings 22, 23, 24, 25, 26 and 27, illustrated by dotted lines in FIG. 2. It will be noted, with reference to FIG. 2 that such openings are generally equidistantly spaced between ends 28 and 30 of the cover 14, to correspond to cells of the casing 11, to which the cover 14 is applied. The cells 22 through 27 are each of a length as long as permissible, as measured from side-to-side 31, 32 of the cover 14, as dictated by the presence of longitudinally disposed grooves 33, 34, 35, 36 and 37, in the upper surface 15 of the cover 14. It will be noted that the longitudinally disposed grooves 33 through 37 are along sides 31, 32 of the cover 14.

Openings 38 and 40 are provided, positioned as illustrated in FIG. 2, for accommodating terminal posts protruding upwardly from groups of plates in end-most cells 22 and 27, respectively.

A rectangular relieved portion, of channel-like cross-sectional configuration 41 is disposed in the surface 16 of the cover 14, generally about the periphery thereof, as illustrated in FIGS. 2 and 3, such relieved portion 41 being of rectangular configuration. Similar parallel relieved portions 42, 43, 44, 45 and 46 are provided, extending between those portions of relieved portion 41 that are disposed along the sidewalls 31 and 32, with such relieved portions 42 through 46 being generally parallel to each other and being cut or molded into the integral walls 47, 48, 49, 50 and 51, respectively, that separate adjacent ones of the head space zones 22 through 27, from each other, as illustrated in FIG. 2. It will be noted that all of the relieved zones 41 through 46 are of the same general depth as illustrated for the zone 41 of FIG. 3, and communicate with each other.

The grooves 33 through 37 are elongated as illustrated, and of a depth as illustrated in FIG. 3, having generally arcuate bottoms, or lower ends 52. A plurality of openings, or slotted holes 53 are provided, between the lower ends 52 of the grooves and the lower surface 16 of the cover 14. It will be noted that adjacent grooves such as those 33 and 35 illustrated in FIG. 4, are separated from each other by non-conductive material 54 of the cover 14.

The lower most ends of the slotted holes 53 are chamfered as illustrated at 55, 56 in FIG. 3, and as at 57, 58, in the illustration of FIG. 4, for providing ease of inlet of cell plate lugs thereinto, for guiding of the lugs into the slots 53. It will be noted that the cover 14 is constructed to allow a maximum in available head space, and accordingly, panels such as 54, and 47 through 51 will be of minimum practical dimension, with due regard for separating the head space openings one from the other, and for providing the desired rigidity and allowance for relieved portions 42 through 46 therein.

Figure 5:
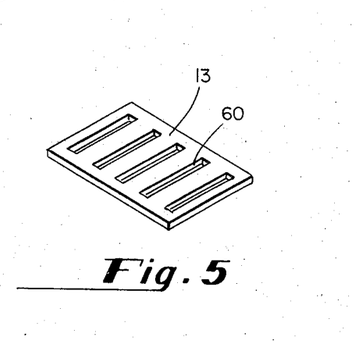
FIG. 5 is a top perspective view of a battery plate spacer, in accordance with this invention.

With reference to FIG. 5, a spacer 13 is illustrated, as comprising a thin strip of thermoplastic sheet material or the like, having a plurality of parallel slotted holes 60 therein, of any selected number. For example, for the spacer 13 illustrated in FIG. 5, there are five slotted holes 60, and in some of the spacers illustrated in FIG. 1, for example, there are six slotted holes, an appropriate spacer 13 being selected depending upon whether or not it is to space five or six lugs, which in turn, depends upon whether or not a given group of lugs in a cell, along one side of the battery are "positive" lugs, or "negative" lugs. It will thus be apparent that, if a given plate in a given cell, or for disposition within a given cell, is facing in the wrong direction, such will be apparent, in that a suitable spacer 13 for that particular group of lugs either will not fit over the lugs, or upon so fitting, one of the slotted holes 60 will not have a lug disposed therein.

Figure 6:
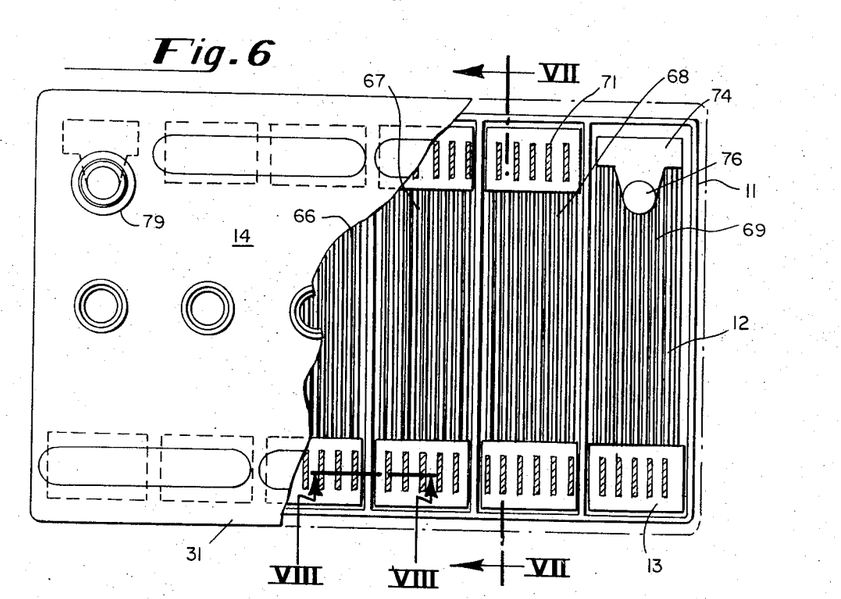
FIG. 6 is a top plan view of the battery of FIG. 1, with portions broken away for the sake of clarity, to illustrate components disposed inside the battery.
Figures 7, 8:
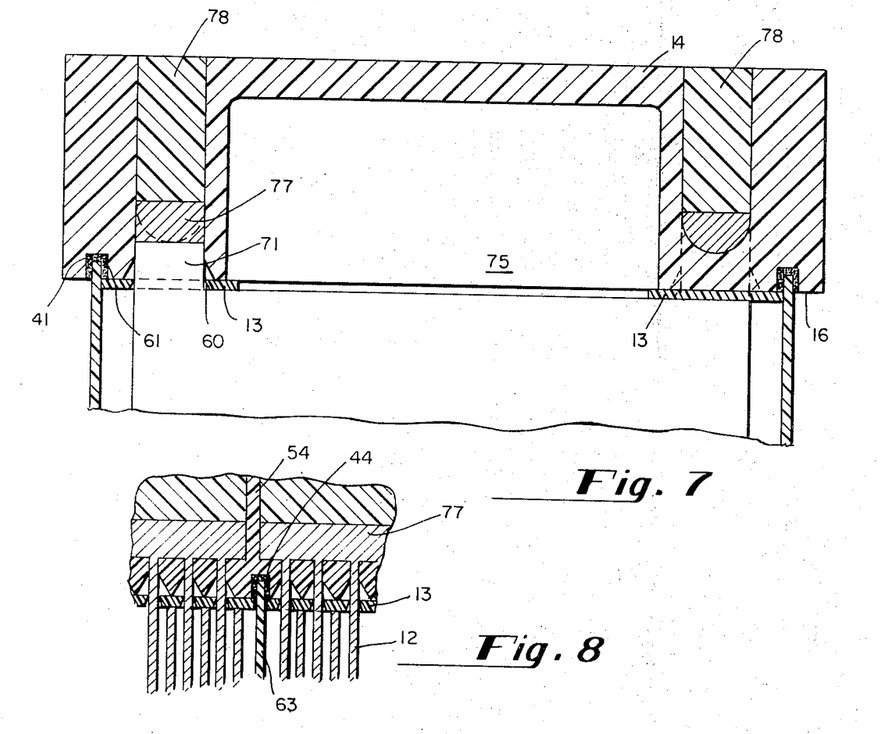
FIG. 7 is an enlarged transverse sectional view taken through the battery illustrated in FIG. 6, generally along the line VII—VII of FIG. 6.
FIG. 8 is an enlarged fragmentary longitudinal sectional view taken generally along the line VIII—VIII of FIG. 6.

With reference to FIGS. 6 through 8, the cover 14 is illustrated in disposition on the casing 11, with the rectangular relieved portion 41 in receiving engagement over the upper outer wall portions of the correspondingly matingly dimensioned wall portions of the casing 11, as illustrated in FIG. 7, with an epoxy, heat sealant, or solvent sealant 61 disposed therein. The sealant 61 may be of any of the types aforementioned, such as will effect an acid-resistant electrically non-conductive water and air impermeable seal between the cover 14 and casing 11. Similarly, the relieved portions 42 through 46 are in engagement with upper ends of cell partition panels such as that 63 illustrated in FIG. 8 relative to the relieved portion 44. An identical seal to that provided by the sealant 61, is provided between relieved portions such as those 44 and upper ends of partition panels such as that 63.

Cell plates 12, which may be of conventional construction, are disposed within the cells 64 through 69, as illustrated, with the spacers 13 disposed over upstanding lugs 71, and with the spacers 13 generally resting on upper edges 72 of the plates 12, and against the lower surface 16 of the cover 14. However, such is not essential, in that the positions of the plates 12 within the cells may vary, depending upon the amount (if any) the bottom of each cell plate 12 is disposed above the bottom 73 of the casing 11.

In those end-most cells 64 and 69, and along the side 32 thereof, the plates 12 have their lugs 71 connected in a conventional manner by a welded lead strap such as that 74, disposed inside the interior 75 of the battery 10, and precisely, in the head space zones 22 and 27, with each strap 74 terminating in a upwardly extending terminal post 76, in a conventional manner, for disposition through an opening such as that 38 or 40 of the cover 14, for receipt within a metal member 77 in electrically connecting relation therewith, in any suitable conventional manner.

Those portions of the lugs 71 that protrude through slots 53, into the lower ends 52 of grooves 33 through 37, are welded together as illustrated at 77 in FIGS. 7 and 8, into a fused weldment. Such may be effected by applying heat to the upper ends of the lugs 71 of the plates 12, and no additional weld metal, or by applying additional weld metal, as desired. Moreover, such may be accomplished by the application of open flame, or by applying a heated element to such upper ends of lugs 71, as desired. In the latter event, thermal relay welding may be desirable. It will further be noted, that if desired, all of the grooves 33 through 37 may be welded as illustrated in FIGS. 7 and 8, at one time, for a common welding operation that lends itself toward automation, if desired. Furthermore, it will be noted that such a welding operation may be constructed with the casing in the vertical position illustrated in FIG. 7, for example, with the cover 14 thereon, also as illustrated in FIG. 7.

With respect to materials, it will be noted that the cover 14 should preferably be of a material that will resist the heat of welding or formation of weldments 77. It will also be noted that after the weldments 77 have solidified, it will be desirable to cover such weldments, and preferably to fill up the grooves 33 through 37 with a suitable non-conductive coating material 78, of resin, thermoplastic, or the like, of any type.

It will be noted, that the use of the spacers 13 are particularly desirable, in maintaining the lugs 71 upstanding, and properly aligned, in order that, as the cover 14 is applied over the upper end of the casing 11, and with the casing 11 already containing the plates 12 therein, the lugs 71 must "find" the slots 53 in the cover 14. Also, the chamfers 55, 56, 57 and 58 will facilitate such "finding" of the slots 53 by the lugs 71. Thus, such will facilitate ease of assembly of the cover 14 onto the casing 11.

Furthermore, it will be noted that the sealant 61 may be provided either to the recessed portions 41, 44 or to the casing walls and partition walls to which the relieved portions 41 and 44 are to be engaged with, as desired. It is, of course, only necessary that such sealant 61 be applied prior to assembly of the cover 14 and casing 11 together. However, in some instances, a sealant 61 may not be desired, it being desired to rely upon a clamping application, or perhaps even an external heating operation for fusing of such interfitting parts together.

Figure 9A:
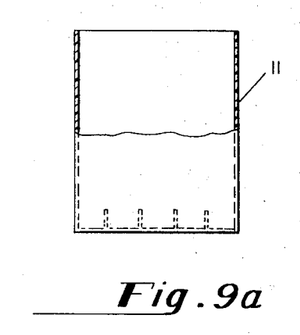
FIGS. 9a, 9b, 9c, 9d, 9e and 9f are sequential schematic illustrations of various stages in the manufacture of the battery of this invention.
Figure 9B:
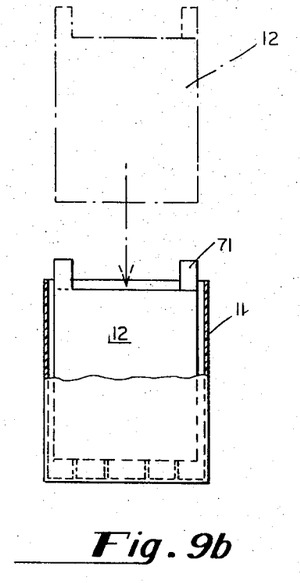
Figure 9C:
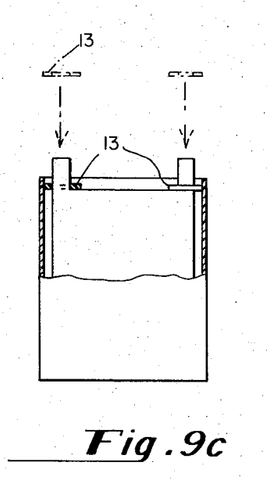
Figure 9D:
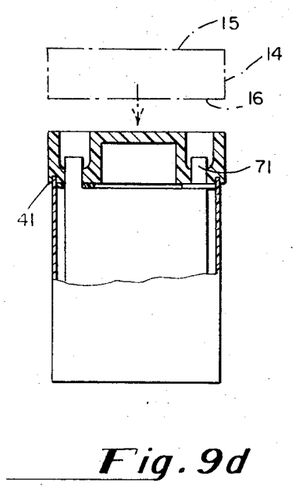

With reference to FIGS. 9a through 9f it will be seen that, in accordance with the process of this invention, a casing 11 will be provided, having the plates 12 disposed therein, and generally then the spacers 13 will be disposed over upwardly protruding lugs 71 of the plates 12, as discussed above, although it will also be apparent that the spacers 13 could be disposed over groups of lugs 71 of groups of plates 12, prior to insertion of such groups of plates into appropriate cells of the casing 11, if desired. However, the preferred sequence will generally be that of first disposing the plates 12 into cells of the casing 11, and then applying the spacer 13 thereto, as illustrated most particularly in FIGS. 9b and 9c. A sealant will then be generally applied to the relieved portions in the lower surface 16 of the cover 14, and the cover 14 will be disposed onto the upper end of the casing 11, with the relieved portions 41 and 44 thereof in receiving engagement with upper ends of casing walls and partition panels, and with the lugs 71 being received within slots 53, with their upper ends protruding into lower portions 52 of grooves 33 through 37 in upper surface 15 of the cover 14, as illustrated in FIG. 9d.

Figure 9E:
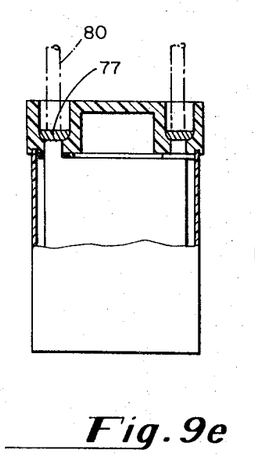
Figure 9F:
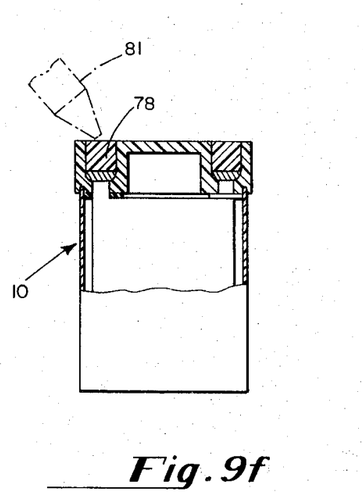

The melting step of FIG. 9e will then take place, with a heated member such as that 80 being applied to the upper ends of the lugs 71, to melt the same, and cause the melt of the same to fill the lower ends 52 of the grooves 33 through 37, such melting being caused to happen in all of the grooves 33 through 37, concurrently, as by bringing a vertically movable head downwardly, having five heating elements carried thereby, into engagement with lugs at the bottoms of five elongated grooves 33 through 37. As aforesaid, if desired, additional weld material may be applied at this time into the grooves 33 through 37.

Upon withdrawal of the heating elements 80, and solidification of the weldments 77 taking place, a sealant 78 is applied by a suitable gun 81, either sequentially, or concurrently into all of the grooves 33 through 37, as desired.

The battery 10 is then ready for applying outer members 79 to terminal posts as discussed above, and for activation with an acid and water, and charging thereof. However, in many instances, it will be desired to first test the battery prior to completion of the step illustrated in FIG. 9f.

It will also be apparent, although the same has not been specifically recited as a necessary method step, that separators are generally disposed between adjacent plates 12, at the time of the insertion of the plates 12 into cells of the casing 11. However, such is a commonplace utilization, and is not introduced by way of illustration into the drawings, in order to avoid confusing the illustrations with extraneous lines, not particularly pertinent to the construction or sequence of this invention.

It will thus be apparent that, by making the cover of the construction shown, to have lower ends of its grooves 33 through 37, disposed at an elevation such as those illustrated, with respect to the interior of the battery, a short electrical path between lugs within the same cell, and between lugs that are to be connected by weldments 77 traversing adjacent cells is provided. Furthermore, a proces is illustrated for providing such electrical connections by the use of the material that forms the lugs 71 themselves, by a process that enables all welding except that of the post straps 74 to be done at once. Furthermore, such welding is effected as a top assembly operation, in a single position of the battery, without requiring re-orientation or re-positioning of the battery itself. It will further be noted that the device of this invention, particularly the cover 14, lends itself to forming a universal cover for a battery, that will accommodate various heights of lugs, depending upon the desired vertical dimension of the battery, in that the grooves 33 through 37 may be constructed sufficiently deep that any desirable height of lugs of plates can be accommodated. Also, this procedure for construction of the battery allows the plates 12 to be introduced into the cells loosely, in order that they will assume rest positions with respect to the bottoms of their cells, prior to application of spacers 13 to lugs thereof, and prior to burning or welding of connections therefor, in that, once the burning or welding is effected, the positions of the plates cannot change.

It will further be noted that the welding or burning operation of this invention enables the desired welding of lugs that connect plates of the same cell and plates of adjacent cells to take place from outside the battery while the battery cover and casing are disposed together, and outside the zone of the interior of the battery, thereby providing an ease of assembly feature, as well as removing the welded connections from a zone of battery acid vapor.

It will also be apparent that with a fusion of the type described above between upper ends of partition plates that separate adjacent cells from each other, and relieved portions of the cover 14, it is possible to maintain the cells in liquid-tight non-communicating relation with respect to each other, and even to maintain their associated head spaces separate from each other. With respect to the melting operation illustrated in FIG. 9e, for example, it will be apparent that if desired, additional lead, pot metal, or the like may be applied. Also, with respect to the use of materials for the cover and casing of this invention, various thermoplastic materials will be satisfactory, even polypropylene plastic materials being utilized, generally with special sealants in the case of polypropylene utilization. It will further be noted that the application of sealant 78 to the weldments 77 will also protect the weldments 77 from corrosion in air and like atmosphere.

Various modifications may be made in the details of construction, as well as in the use and operation, and in the method of manufacture of batteries, in accordance with this invention, all within the spirit and scope of the appended claims. For example, alteration of the sequence of manufacture or assembly of non-critical components, or even the inclusion of additional steps may be desirable, depending upon the particular application. Such will be understood to be within the scope of this invention.

What is claimed is:

1. A battery of the multiple cell type comprising a casing having upper extremities and partition plates separating adjacent cells, a plurality of positive and negative battery plates alternately disposed in each cell, each of said plates having a lug portion extending above said upper extremities and above said partition plates, a unitary cover extending across said upper extremities and closing upper ends of said cells, and means connecting battery cell plates in a given cell of one polarity with cell plates of opposite polarity of an adjacent cell, said connecting means being totally above said upper extremities to connect cell plates at said portions extending above said upper extremities, said unitary cover being configured to define openings for said portions of cell plates extending above said upper extremities, and weldment means securing said connecting to said cell plates.

2. The battery of claim 1, wherein said openings comprise slots in said cover, protruding lug portions of battery cell plates extending through said slots, and said weldment means integrally connects said lug portions that protrude through said slots.

3. The battery of claim 2, wherein said cover includes a groove in an upper surface thereof, said groove extending the length of two adjacent said cells, in communication with slots of adjacent said cells, and with a plurality of lug portions of each cell of a pair of adjacent cells being in integral connection at the lower end of said groove, by said weldment means.

4. The battery of claim 3, wherein there are a plurality of said grooves in said cover, each disposed above and substantially spanning two said cells with weldment means in the lower ends of said grooves connecting lug portions of cell plates in cells disposed therebelow.

5. The battery of claim 4, wherein one said slot is provided for each said cell plate having a protruding lug portion.

6. The battery of claim 4, wherein alternate cell plates within each said cell have their protruding lug portions received within associated said slots in said cover along alternate sides of the battery.

7. The battery of claim 3, wherein an electrically insulating coating material is provided in said groove, above said weldment.

8. The battery of claim 6, wherein spacer members are provided each for disposition onto upstanding protruding lug portions within an associated said cell along one side thereof, each said spacer member being provided with slots for receiving lug protions therein, for facilitating alignment of lug portions with said slots in said cover, during assembly thereof.

9. The battery of claim 4, wherein said cover is provided with means engaging upper ends of the casing walls and upper ends of cell partition plates.

10. The battery of claim 9, wherein said engaging means comprises relief means, for receiving upper ends of casing walls and partition plates therein and a sealant in said relief means for sealing separating adjacent cells from each other above their partition plates, and for sealing the cover to the casing about the upper periphery of the casing.

11. The battery of claim 6, wherein lower ends of said slots are chamfered for guiding upper ends of lug portions thereinto.

12. The battery of claim 6, wherein electrically insulating coating material is provided in said grooves, above weldments disposed therein, wherein spacer members are provided each for disposition onto upstanding protruding lug portions within an associated said cell along one side thereof, each said spacer member being provided with slots for receiving lug portions therein, for facilitating alignment of lug portions with said slots in said cover, during assembly thereof, wherein said cover is provided with means engaging upper ends of the casing walls and upper ends of cell partition plates, wherein said engaging means comprises relief means, for receiving upper ends of casing walls and partition plates therein and a sealant in said relief means for sealing separating adjacent cells from each other above their partition plates, and for sealing the cover to the casing about the upper periphery of the casing, including a headspace zone above each said cell in the cover, each in communication with its associated said cell.

13. A battery of the multiple cell type comprising: a casing having a bottom, generally upstanding sides, and cell dividing walls said sides and dividing walls defining an upper extremity of said casing; a plurality of positive plates and a plurality of negative plates arrayed alternately in each of the cells, each plate having a main surface conforming generally to the cross section of the cells and an upstanding lug extending beyond said upper extremity when the plates are positioned in the cells, the lugs of positive and negative plates being disposed at opposite ends in a given cell, the disposition of positive and negative plates being reversed between adjacent cells; a plurality of plate separators configured to mate with the lugs of all plates of the same polarity in a given cell; a unitary battery cover having a lower surface configured to mate with said upper extremities of said casing at said walls and said sides, all other portions of said cover being located above said lower surface and connected thereto by generally vertical support members, said cover having a platform portion overlying said support members, said platform portion having a plurality of channels in its top portion, each channel being two cells wide to span the lug portions of the positive plates of one cell with the negative plates of a first adjacent cell and the lug portions of the negative plates of said one cell with the positive plates of a second adjacent cell, said cover defining slots in said channels penetrated by respectively spanned lug portions of plates, said cell portion further defining inlet voids for each cell and openings above each end cell for terminal posts, said slots being chamfered at their lower ends and said channels having generally rounded lower surfaces;

nonconductive securement means for attaching the lower surface of said cover to the upper extremities of said casing, thereby defining headspace openings in each cell between the main surface of said plates and the lower platform surface of said cover;

electrically conductive weldment means connecting all the lug portions penetrating the slots of each channel in said cover;

nonconductive sealant over said weldment means to fill each of said channels;

a positive terminal connected by electrically conductive straps to the lugs of positive plates for one end cell of said battery which are not connected to negative plates of an adjacent cell; and a negative terminal connected to the lugs of negative plates in the end cell opposite said one end cell.

* * * * *